Nov. 8, 1960  K. E. A. GOTHBERG ET AL  2,959,249
OIL MIST LUBRICATING METHOD

Original Filed March 6, 1947  3 Sheets-Sheet 3

INVENTORS
KARL EVALD ANDREAS GOTHBERG
SIGURD SANDAHL
BY THEIR ATTORNEYS

United States Patent Office 2,959,249
Patented Nov. 8, 1960

2,959,249

OIL MIST LUBRICATING METHOD

Karl Evald Andreas Gothberg, Backasen Lerum, and Sigurd Sandahl, Heden, Billdal, Sweden, assignors to Aktiebolaget Svenska Kullagerfabriken, Goteborg, Sweden Continuation of application Ser. No. 336,162, Feb. 10, 1953, which is a division of application Ser. No. 732,901, Mar. 6, 1947. This application Oct. 23, 1957, Ser. No. 694,060

2 Claims. (Cl. 184—7)

Our invention relates generally to methods of lubrication, and more particularly to a novel method for conveying oil from a central source in the form of a mist, and precipitating oil from the mist near the bearing to be lubricated.

This application is a continuation of our copending application, Serial No. 336,162, filed February 10, 1953, now abandoned, which latter application is a division of our application Serial No. 732,901, filed March 6, 1947, which matured into Patent No. 2,642,156 on June 16, 1953.

It has been proposed to lubricate bearings with oil mist generated in an oil mist lubricator, which supplies oil mist to one or more bearings. This system has several advantages as compared to other lubricating systems; for instance, lubrication with drip oilers or the like. One advantage is that the oil consumption can be greatly reduced, since the rate at which oil is supplied to the bearings can be considerably diminished without the risk of interruption of the supply of oil to any of the bearings. Although the saving is considerable as compared with other lubricating methods, much oil is still lost because of the oil supplied to a bearing as oil mist, usually less than 0.5 cm.$^3$ per hour, quite a large proportion escapes through the bearing seals to the atmosphere.

The purpose of the present invention is further to reduce the oil consumption in lubricating systems with oil mist lubricators, and is characterized mainly by one or more local constrictors in the ducts between the place at which the mist is formed and the member or members to be lubricated. The oil mist is precipitated at the constrictors and changed to a mixture of fluid oil and air, whereby practically the whole of the oil in the mist is utilized for lubricating purposes, which is not the case as long as the oil is in the form of small particles suspended in the air. The original transformation of the oil into oil mist then only serves the purpose of making it possible to transport very small quantities of lubricant to the various members to be lubricated, and to distribute the lubricant as desired.

The invention is illustrated in the accompanying drawings, in which

Figure 1:
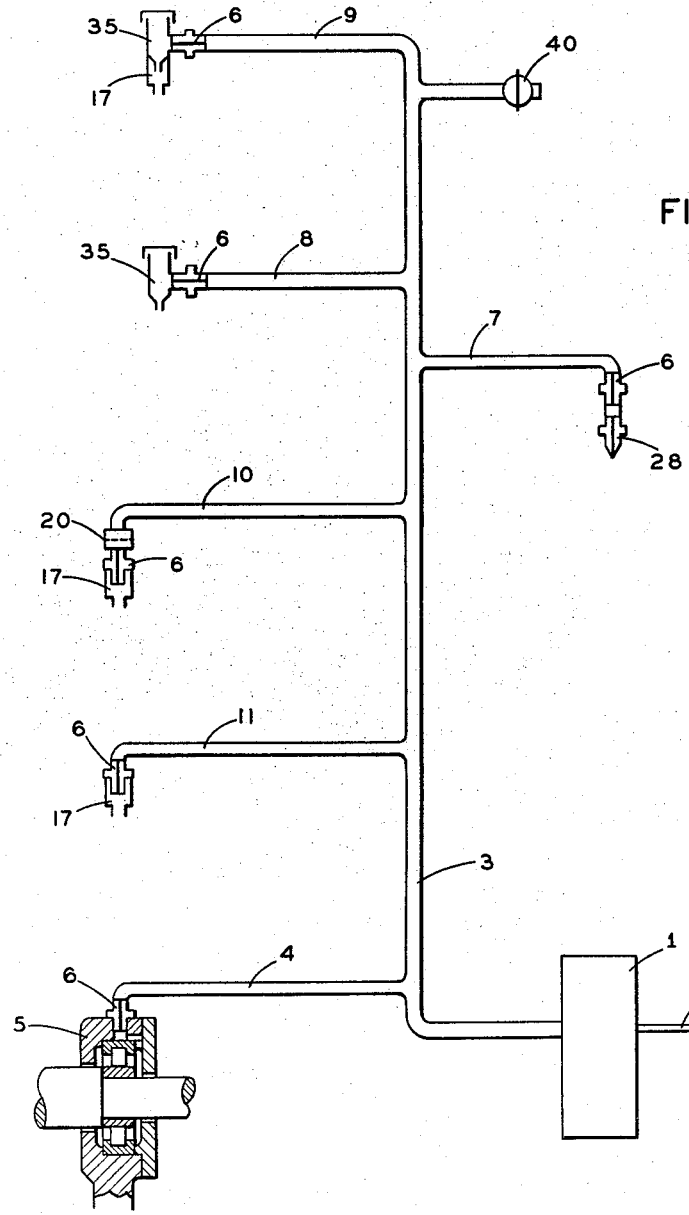
Fig. 1 shows diagrammatically a lubricating system.

Our improved method of lubrication may be practiced by using the lubricating system shown in Fig. 1, wherein the numeral 1 indicates generally an oil mist lubricator of known design, to which air under pressure is supplied from a suitable source through an air line 2. The oil mist generated in the lubricator passes into a main duct 3, which is common to a number of ducts branching off therefrom and each leading to a machine part to be lubricated. Thus the duct 4 leads to a bearing housing 5, in which is a bearing to be lubricated. Before reaching the housing 5 the oil mist from the duct 4 passes through a precipitating nipple 6. The precipitating nipple 6 and a spray nozzle 28 are connected to the duct 7. The duct 8 leads to a precipitating nipple 6 and a drip oiler 35. The duct 9 is provided not only with a precipitating nipple and drip oiler, as is the duct 8, but also with a sight glass assembly 17. A filter 20 is connected in front of the precipitating nipple 6 in the duct 10. The nipple 6 in the duct 11 is provided with a sight glass assembly 17. The internal diameter of the branch ducts leading to the precipitating nipples may be about 6 mm., or somewhat greater if a larger quantity of lubricant is required. The internal diameter of the main duct should be 12 mm. or more.

Figure 2:
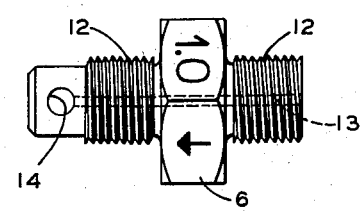
Figs. 2 and 3 show two different forms of precipitating nipples.

The precipitating nipple 6 is illustrated in Fig. 2. It is provided with two threaded portions 12 for connection to the lubricating system. The nipple has an axially extending channel or bore 13, which is very constricted relative to the inside diameter of the remainder of the system. The diameter of the bore of the nipple chosen may vary, according to the quantity of lubricant to be provided, from about 0.7 mm. to about 2.8 mm., but will usually be of the magnitude of about 1 mm. The channel 13 opens into a wider cross channel 14. An arrow on the nipple indicates the direction of flow in which the precipitating effect of the nipple is greatest. It has been found that when the oil mist flows through the nipple in the direction indicated by the arrow, as much as 98% of the particles of oil in the mist can be precipitated to form fluid oil. In this manner it is possible to utilize practically the whole of the oil in the oil mist for lubricating purposes.

In a typical system, the ratio of the cross-sectional areas of the branch duct and nipple bore will therefore usually be in the order of 36:1. The ratio of the main duct area to the nipple bore area will usually be in the order of 144:1. Even with several nipples, for example 6 as shown in Fig. 1, the total ratio of the main duct area to nipple area will be in the order of 24:1. It is an inherent characteristic of any fluid flow system that the relative velocities of the fluid at different positions will be inversely proportional to the relative cross-sectional areas at the positions. Hence, with the 24:1 ratio set forth above, the fluid in each nipple bore is approximately twenty-four times as great as its velocity in the main duct.

Thus applicant's improved method provides for substantially increasing the velocity of the mist in the condensing fitting. Also it provides for directing the high velocity mist against a surface, whereby the oil is very efficiently precipitated from the air. Both are necessary.

Directing a low velocity aerosol against a surface will not efficiently precipitate the oil; otherwise the oil would be almost entirely precipitated in the ducts. Commercial experience has shown that merely increasing the aerosol velocity through a small diameter bore in a nipple will not efficiently precipitate the oil.

The precipitating nipple is preferably connected in the branch duct leading from the main duct to the bearing to be lubricated. By means of the nipples it is possible to distribute the lubricant among the various branch ducts in proportions as required by the various bearings. This is done by using for each bearing a nipple having a bore of suitable diameter. If it is found that a bearing requires more, or possibly less, lubricant the nipples can easily be exchanged.

Figure 3:
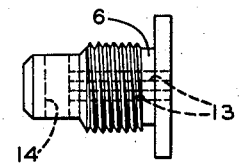

Fig. 3 shows a form of the nipple which does not differ in principle from the nipple according to Fig. 2, but which is very suitable for use when the oil mist is led through channels in a bearing housing instead of through tubes. This nipple is provided with two axially extending channels 13, both of which open into the cross channel 14.

Figure 4:
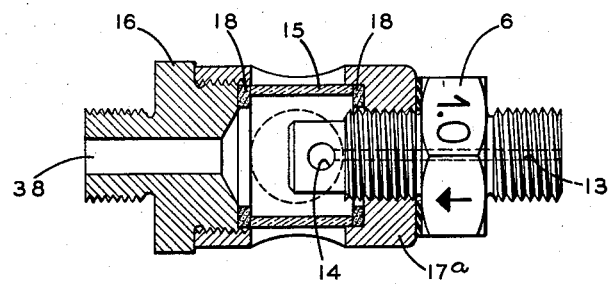
Fig. 4 shows a precipitating nipple, combined with a sight glass.

Fig. 4 shows a precipitating nipple 6, combined with a sight glass 15, mounted in a housing comprising two parts 16 and 17 screwed together. The cylindrical glass 15 is sealed by packings 18. The direction of flow is from the nipple and the oil and air leave through an opening 38. If the speed of the flow is sufficiently great, it is possible to see through the glass how the oil precipitated in the nipple follows the stream of air and thus check that no stoppage has taken place.

Figure 5:
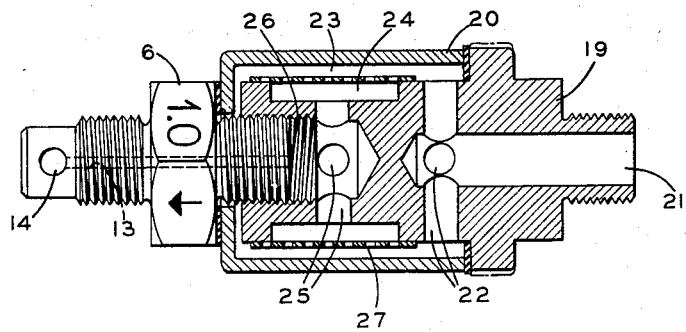
Fig. 5 shows a nipple combined with a filter.

In the device according to Fig. 5, the nipple 6 is screwed into a body 19 of a filter and holds a casing 20 on the body. The body 19 is provided with an axially extending channel 21, which opens into a pair of cross channels 22. These lead to an annular chamber 23 between the casing 20 and the body 19. A peripheral groove 24 is provided in the body from which a pair of cross channels 25 lead to the axially extending channel 13 in the nipple 6 through an axial bore 26 in the body 19. A filter 27 surrounds the groove 24 and separates it from the chamber 23. The oil mist flows through the channel 21 and the cross channels 22 to the chamber 23. After passing through the filter 27, where it is filtered, and into the groove 24, it proceeds further through the cross channel 25 and the bore 26 to the channels 13 and 14 in the nipple, where precipitation takes place. In this manner any loose particles or solid bodies are prevented from reaching the relatively constricted passage 13 where they might become lodged. As a rule the ducts will be free from such particles and the filter need only be used in especially important cases.

Figure 6:
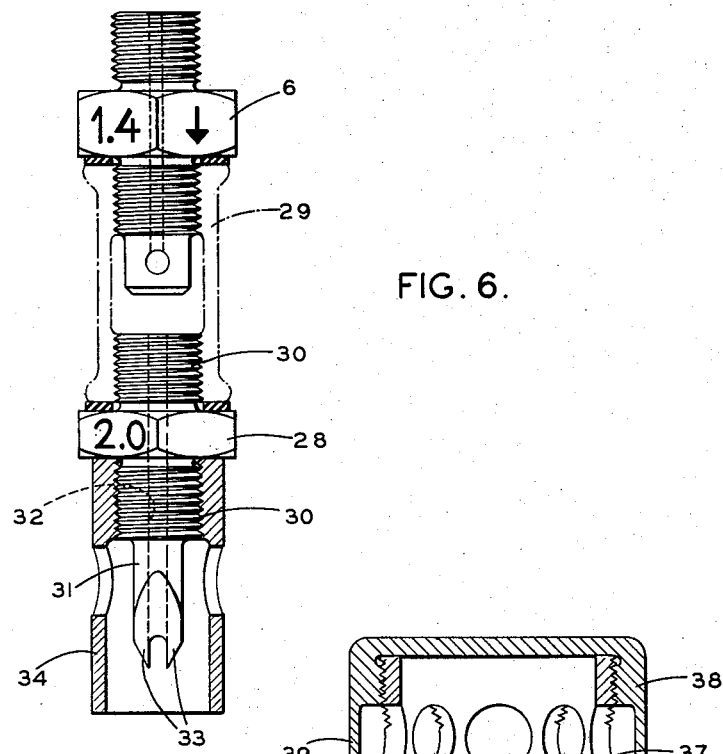
Fig. 6 shows a precipitating nipple combined with a spray nozzle.

Fig. 6 shows a precipitating nipple 6 connected to a spray nozzle 28 by means of a sleeve 29. The nozzle has a pair of threaded portions 30 and a cylindrical extension 31. It has an axial bore 32. One end of the extension 31 is wedge shaped so that a pair of sharp points 33 are formed. A protecting sleeve 34 for the points is screwed onto one of the threads 30. The cross sectional area of the bore of the nozzle should be 50% to 100% greater than that of the precipitating nipple. The oil precipitated in the nipple gathers on the points 33 and is carried along by the flow of air in the form of small drops, which are spread onto the surface to be lubricated. The nozzle is suitable for lubricating free surfaces such as plates, tools for presses, gear teeth, driving chains, etc. In certain cases, for instance for lubricating bearings in bearing housings, the nozzle can be mounted directly in a threaded hole in the wall of the housing so that it points toward the rolling bodies of the bearing.

Figure 7:
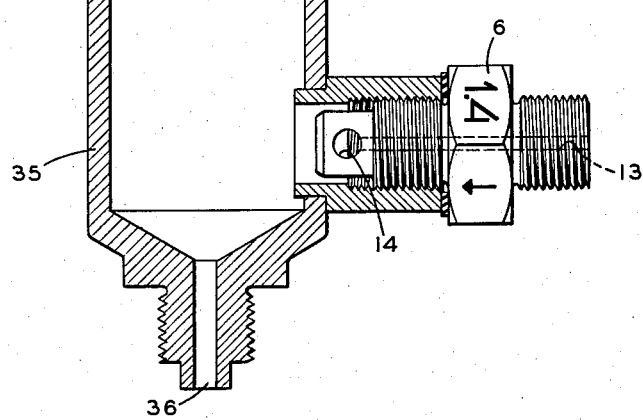
Fig. 7 shows a nipple combined with a drip oiler.

For lubricating sliding surfaces, it is preferable to have an apparatus which can deliver drops of oil separate from the flow of air. An apparatus of this kind is shown in Fig. 7, and consists of a precipitating nipple connected to a drip oiler. The drip oiler has a chamber 35, provided at its lower end with an oil outlet 36. At the top of the chamber are a number of air escape holes 37. A cover 38 is screwed on to the chamber and has a downwardly directed flange 39 for protecting the holes. While passing through the precipitating nipple 6 the oil particles suspended in the oil mist are united to form fluid oil, which emerges from the chamber 35 through the outlet 36 in the form of drops of oil. The air escapes through the outlets 37. The apparatus thus functions as an oil dripper and the quantity of oil can be regulated by using a precipitating nipple having a suitable area of flow. When a machine is being started for the first time it may be advisable to unscrew the cover 38 and drop a few drops of clean oil into the chamber 35.

The oil dripper according to Fig. 7 can be combined with the sight glass according to Fig. 4, whereby it is possible to check the flow of the oil through the glass.

In order to check if lubricant is reaching all parts to be lubricated, especially in cases where there is no sight glass, a valve (40 in Fig. 1) can be connected at any suitable point in the main duct, whereby the duct can be put in communication with the atmosphere. It is thus possible to lower the pressure in the main duct while maintaining or even increasing the production of oil mist. The rate of flow through the precipitating nipples can in this way be reduced to such a low value that none, or only a very small part, of the oil mist flowing through the nipples is precipitated in the form of fluid oil. The oil mist reaching the various places of lubrication leaks out through the seals or through the outlets from the branch lines and is visible in the form of a white mist.

Other combinations of the elements above described are, of course, possible without departing from the spirit of the invention. The nipples can be provided with any number of axial channels. It is also possible to use filters or the like, which form a greater number of constricted passages than the nipples above described.

The word "surface" as used in the claims refers to the peripheral wall of the cross-channel 14 and any equivalent thereof.

Having thus described our invention, what we claim as new and desire to secure by Letters Patent of the United States, is:

1. The method of supplying lubricant to a machine having parts to be lubricated, which parts are incapable of precipitating sufficient oil from an aerosol, said method comprising the steps of producing an aerosol characterized by very fine mist particles, conveying the aerosol to positions adjacent the parts to be lubricated, increasing the velocity of the aerosol to a relatively high velocity in each position, maintaining substantial flow of high velocity aerosol, directing the high velocity aerosol against a stationary surface generally transverse to the direction of aerosol flow to precipitate substantially all of the oil from the aerosol, and conveying the precipitated oil in liquid form to the parts to be lubricated.

2. The method of supplying lubricant to a machine having parts to be lubricated, which parts are incapable of precipitating sufficient oil from an aerosol, said method comprising the steps of producing an aerosol characterized by very fine mist particles, conveying the aerosol to positions adjacent the parts to be lubricated, increasing the velocity of the aerosol to a relatively high velocity in each position, directing the high velocity aerosol against a stationary surface generally transverse to the direction of aerosol flow to precipitate substantially all of the oil from the aerosol, and conveying the precipitated oil in liquid form to the parts to be lubricated.

References Cited in the file of this patent

UNITED STATES PATENTS

| | | |
|---|---|---|
| 1,893,995 | Jung | Jan. 10, 1933 |
| 2,334,942 | Malone | Nov. 23, 1943 |